E. W. MOREHOUSE.
WORK HOLDING MEANS.
APPLICATION FILED JAN. 12, 1904.
924,178.
Patented June 8, 1909.
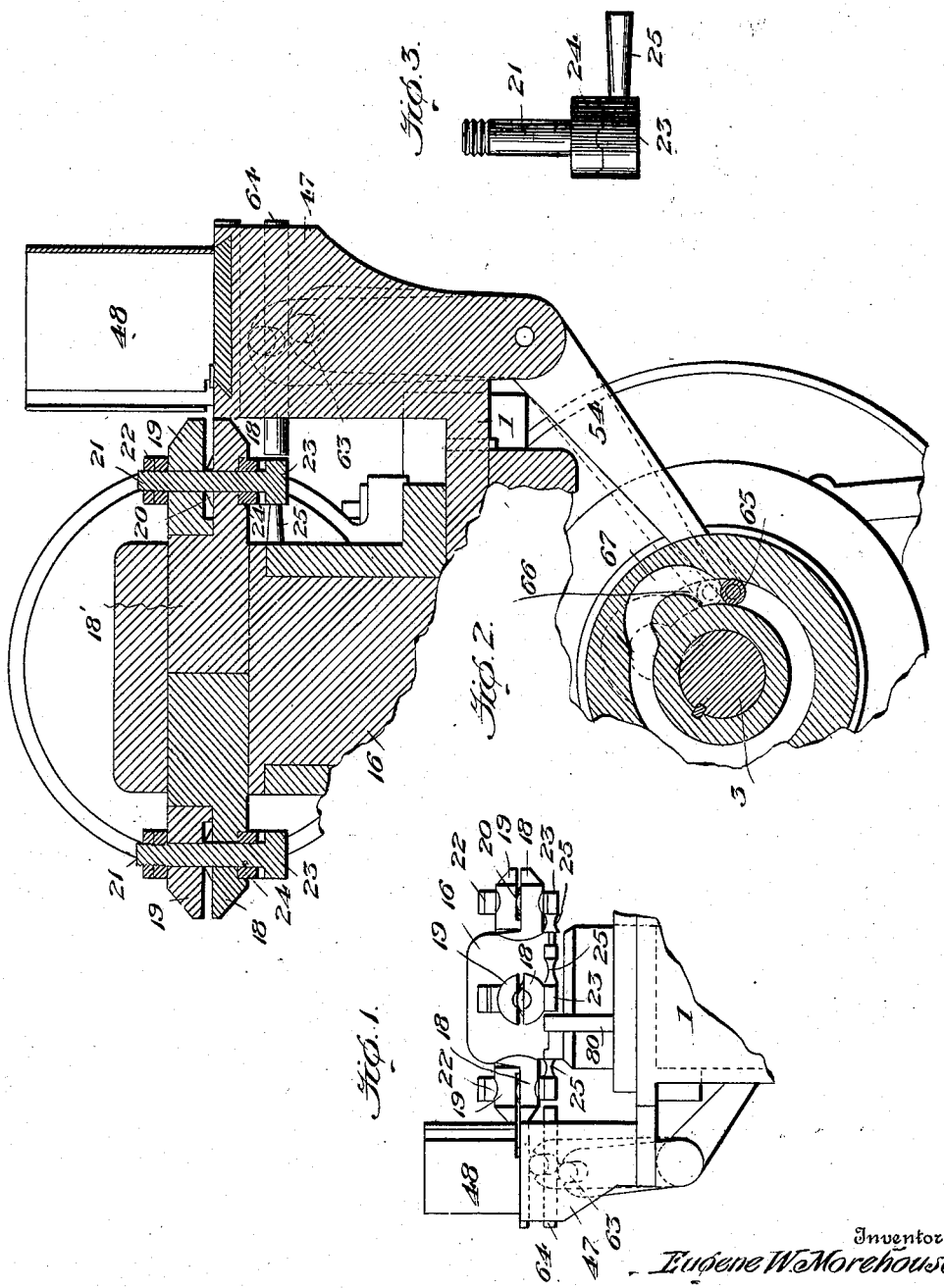

UNITED STATES PATENT OFFICE.

EUGENE W. MOREHOUSE, OF PROVIDENCE, RHODE ISLAND.

WORK-HOLDING MEANS.

No. 924,178.  Specification of Letters Patent.  Patented June 8, 1909.

Application filed January 12, 1904. Serial No. 188,688.

*To all whom it may concern:*

Be it known that I, EUGENE W. MOREHOUSE, a citizen of the United States, residing at Providence, in the county of Providence and State of Rhode Island, have invented certain new and useful Improvements in Work-Holding Means, of which the following is a specification, reference being had therein to the accompanying drawing.

My invention relates to work holding means; and it contemplates the provision of peculiar and advantageous means for taking hold of, carrying, and releasing work, and designed more especially for use in machines adapted to reduce and point flat or cylindrical blanks employed as tongues or stem members of scarf pins, brooches or analogous articles.

The invention will be fully understood from the following description and claim when the same are read in connection with the accompanying drawings, in which:

Figure 1 is an elevation of so much of a machine of the kind stated as is necessary to illustrate my present invention. Fig. 2 is an enlarged detail vertical section of a portion of the machine. Fig. 3 is an enlarged elevation of parts of my improvements, hereinafter referred to in detail.

Similar numerals designate corresponding parts in all of the views of the drawings.

At 48 is a receptacle on an extension 47 of a fixed frame 1, and having a discharge for pin blanks.

3 is a drive shaft.

80 is a fixed pin, and 16 is a suitably supported and rotated turret in which are radially mounted a plurality of equi-distant chucks.

As before stated, the chucks are spaced equally apart, the shanks 18 of the chucks being received within the turret, and bearing a fixed relation thereto. The chucks comprise lower jaws 18 formed integral with the shanks, upon the former resting the upper jaws 19, both being traversed by pins 21 having their upper ends threaded and receiving nuts 22. The lower extremities of the pins are provided with heads, 23, having cam-shaped upper faces coacting with the similarly formed cam faces of annular blocks, 24, fixed in depressed portions formed in the lower faces of the lower jaws, 18, shown more clearly in Fig. 2 of the drawings. An outwardly projecting fixed lever, 25, is carried by each pin head, 23, these levers being tangentially arranged in relation to the turret circumference, as shown in Fig. 1. The jaws are normally retained in an open position by means of intermediate curved springs 20.

The jaws are automatically opened and closed. The mechanism to effect this will be hereinafter referred to. The levers 25, operated by this mechanism, when thrown inwardly, contract the jaws by virtue of the cam faces of pin heads 23 riding over the cam faces of blocks 24, thereby causing the jaws to move inwardly and grasp the blank. The release of the jaws is effected by imparting a reverse movement to the said levers, 25, permitting expansion of the jaws and the release of the blank.

The machine is designed to contract the jaws of the work holding chuck about the pin blank immediately after the latter has been fed to the chuck, and to accomplish this the extension 47 is provided with a reciprocating rod, 64, having a depending projection, 63, connected to the upper arm of lever, 54, the lower arm of said lever carrying a cam roller, 65, traveling in channel, 66, of cam, 67, the latter in turn being keyed to shaft, 3.

By inspection of Fig. 2 of the drawings, it will be seen that the reciprocating bolt, 64, during its forward movement will throw the arms, 25, of pin head, 21, inwardly contracting the jaws about the pin blank and securely retaining the latter.

At a certain point in the rotation of the turret 16, the pin blanks are in a position to be discharged from between the jaws of the work holding chucks. This is accomplished by a pin, 80. This pin, lying in the path of the arms, 25, will, when the turret is revolved, throw the arms, 25, outwardly permitting the cam faces of the block, 24, to seat between the cam faces of pin head, 21, permitting the bowed spring 20, to expand the jaws, thus releasing the pressure from the pin blanks, each chuck being successively opened in this manner.

Having thus fully described my invention what I claim and desire to secure by Letters Patent is:—

In a machine for the purpose set forth, the combination of a main frame, a rotary turret, a chuck carried by the turret and comprising jaws, a pin extending through the jaws and having a head provided with a cam face and a lever, and a complementary cam face on one of the jaws, means on the main frame for coöperating with said lever and closing the chuck, and means on the main frame for coöperating with the said lever and opening the chuck.

In testimony whereof I have affixed my signature in presence of two witnesses.

EUGENE W. MOREHOUSE.

Witnesses:
 HORATIO E. BELLOWS,
 WILLIAM E. BROWN.